(12) United States Patent
Fishman

(10) Patent No.: US 12,368,907 B1
(45) Date of Patent: Jul. 22, 2025

(54) ATTESTING THE VERACITY OF AUDIOVISUAL DEPICTIONS

(71) Applicant: Reel, Inc., Middletown, DE (US)

(72) Inventor: Daniel Fishman, Accokeek, MD (US)

(73) Assignee: Reel, Inc., Middletown, DE (US)

( * ) Notice: Subject to any disclaimer, the term of this patent is extended or adjusted under 35 U.S.C. 154(b) by 0 days.

(21) Appl. No.: 18/609,476

(22) Filed: Mar. 19, 2024

(51) Int. Cl.
*H04N 21/2343* (2011.01)
*H04N 21/41* (2011.01)
*H04N 21/422* (2011.01)
*H04N 21/854* (2011.01)

(52) U.S. Cl.
CPC . *H04N 21/234345* (2013.01); *H04N 21/4126* (2013.01); *H04N 21/422* (2013.01); *H04N 21/85406* (2013.01)

(58) Field of Classification Search
CPC ....... H04N 21/234345; H04N 21/4126; H04N 21/422; H04N 21/85406
See application file for complete search history.

(56) References Cited

PUBLICATIONS

International Organization for Standardization / International Electrotechnical Commission (ISO/IEC), "Information Technology—Coding of Audio-Visual Objects, Part 12: ISO Base Media File Format;" International Standard 14496-12, 7th Edition; Jan. 2022; 264 Pages.

International Organization for Standardization / International Electrotechnical Commission (ISO/IEC), "Information Technology—Coding of Audio-Visual Objects, Part 14: MP4 File Format;" International Standard 14496-14, 3rd Edition; Jan. 2020; 20 Pages.

*Primary Examiner* — Anthony Bantamoi
(74) *Attorney, Agent, or Firm* — DALY, CROWLEY, MOFFORD & DURKEE, LLP (57) ABSTRACT

A system and method attest the veracity of audiovisual depictions by inferring motion of the device recording those depictions from the audiovisual data, and comparing this inferred motion with contemporaneously sampled sensor data from that device, such as accelerometer or GPS data. If the inferred motion sensibly corresponds to changes in the other sensor data, then the video is determined to be authentic. Otherwise, an anomalous condition is signaled, altering the viewer that the video may have been digitally altered.

20 Claims, 5 Drawing Sheets

ATTESTING THE VERACITY OF AUDIOVISUAL DEPICTIONS

FIELD

The disclosure pertains generally to audiovisual communication, and more particularly to methods and arrangements for coding and decoding digital video signals having additional embedded information.

BACKGROUND

The digital data of audiovisual depictions ("videos" for simplicity) may be kept in one of several standard formats. The baseline for many such formats is the ISO/IEC (International Organization for Standardization/International Electrotechnical Commission) Standard 14496-12, "Information Technology—Coding of Audio-Visual Objects—Part 12: ISO Base Media File Format", most recently published in 2022 ("MOV"). Standard 14496-12 defines movie container files as a series of objects, called "boxes", and different media formats use these boxes in different ways. For example, the format may include different boxes when the underlying video is streamed over the Internet than when it is stored locally on a computer. A popular extension of the MOV format for both streaming and storing videos is ISO/IEC Standard 14496-14, "Information Technology—Coding of Audio-Visual Objects—Part 14: MP4 File Format", most recently published in 2020 ("MPEG-4 Part 14" or "MP4").

An MP4 file always has several component boxes. A file type box ("ftyp") describes a vendor codec (compression/decompression algorithm), a version, and a list of compatible codecs. A movie metadata ("moov") box includes a box describing the movie as a whole, and one or more per-track boxes that each includes information about the media contained within. The compressed audiovisual data themselves are stored in many movie data ("mdat") boxes. Finally, an optional user data ("udta") box may be included, in which arbitrary data may be stored. For streaming applications, the MP4 file may be fragmented into smaller clips (typically only a few seconds each) so a decoder can render received fragments while additional fragments are downloaded. In such situations, the otherwise top-level "mdat" and "udta" boxes are nested within movie fragment boxes ("moof") that are much smaller units for transmission. The MP4 standard includes many other types of boxes, which are omitted here for clarity.

As is known in the art of video compression, video frames need not be stored as arrays of pixels. Rather, individual video frames are typically divided into subframes ("macroblocks") which can be compressed using a variety of techniques using different frame types, which are now described.

Key frames (also called "intra-frames", or "I-frames") are compressed using only spatial data contained in the frames themselves (i.e., each frame's own macroblocks), and do not use temporal compression. I-frame spatial compression may include, for example, noting that a particular macroblock is identical to another macroblock (e.g., for an image that contains only a single color of pixels, or for images that have large areas that are repeated), or differs only in few pixels to the other macroblock. Individual macroblocks may themselves be compressed without reference to other macroblocks, e.g., using a combination of cosine transforms, quantization, run-length encoding, and Huffman coding. As I-frame compression is self-contained, these frames are often used to "refresh" an image that has become distorted due to bitstream (i.e., channel) errors, and to provide forward and backward "seeking" within a video. I-frames usually have the lowest compression losses to maintain the highest picture quality and facilitate these uses, and thus use the most (compressed) space of any type of video frame.

Predicted frames (also called "P-frames") further allow macroblocks to be compressed using temporal prediction based on previous frames (I-frames or P-frames). As an example, videos of physical environments may include camera pans, in which all (or nearly all) of the pixels of one video frame are shifted in the next frame by a constant motion vector. Encoding this motion vector in the second frame (the P-frame) allows the decoder to predict the second image, and means that the only other data that need to be recorded in the second frame are the differences between the (motion-compensated) predicted image and the previous image. These additional data may be small, and thus highly compressible. If a significant delta exists between a predicted macroblock and the previous one, the former may be spatially compressed in the P-frame, or even skipped entirely by treating it as if it had a zero motion vector.

Finally, bi-directional frames ("B-frames") additionally may use temporal prediction based on frames that have not yet been received by the decoder. B-frames are similar to "in between" frames in traditional animation, and may be used to smoothly blend video between I-frames and P-frames. As B-frames may rely on reverse prediction (i.e., frames that have not yet been received), they require buffering and are typically more resource-intensive than P-frames, but in some situations they can provide better compression. Typically, P-frames and B-frames are much smaller than I-frames when compressed, and their relative frequency and compression settings may be tailored to achieve a particular video quality or streaming bitrate.

Digital media, especially videos stored using MP4, may be manipulated, typically using generative artificial intelligence, to produce a depiction that may be mistaken for a genuine recording of a real person or place. While this technology may be used for legitimate ends (e.g., by movie producers to "de-age" an actor with the latter's consent), it may also be used to defame or impersonate individuals, and to spread disinformation, and in this context such media have been called "deepfakes". As machine learning and artificial intelligence techniques become more advanced, deepfakes are becoming more difficult for a lay person to identify as such, and their increasing use undermines public confidence and trust in what we see and hear.

SUMMARY OF DISCLOSED EMBODIMENTS

Videos captured by a client device represent data from only one sensor (i.e., a camera) of that device. Disclosed embodiments determine whether those data are trustworthy by correlating this data with data simultaneously recorded from one or more other sensors of the device, such as a global positioning system (GPS) receiver, or a built-in accelerometer, gyroscope, or magnetometer. If the video is genuine, motion of the camera (as distinguished from movement of depicted objects) should correspond to the data collected at the same time by these other sensors as both indicative of the same change in a physical state of the camera, such as its position or orientation. Motion of the camera, in turn, may be separately and independently determined by analysis of the video frames. Forward movement may be inferred by pixels of an image traveling generally toward its edges (without loss of resolution) in sequential frames, pans may be inferred by pixels moving generally in a single direction, and so on. These changes may themselves be detectable using data within the video, or using external tools such as a machine learning model that has been trained to classify simultaneous changes in various sensor outputs as genuine or false.

Embodiments may be advantageously used in many different ways. For instance, an embodiment may be used to assign "trust ratings" to user-produced videos on various video hosting and broadcasting platforms. An embodiment may be used to evaluate stored, offline videos and flag any anomalous video frames. An embodiment may be used to enable trusted live, two-way video streaming (e.g., for video conferencing purposes).

Data aggregated from multiple embodiments may be provided to a search engine, which users may access to search for live-streamed or recorded videos by sensor metadata (e.g., GPS coordinates). Or, users may search for particular events (e.g., concerts or sporting events) that are associated with those sensor metadata. In some embodiments, users may directly "ping" other users to request videos having a certain description or relating to a particular event that occurs at a defined time and location, and receive verified footage in response. Because the footage has been verified, the requesting user can be assured that it is genuine. Various embodiments may combine several videos related to such events into a "highlight reel", and or may connect with external data sources to provide additional information about those events. Thus, embodiments may enable contextual information (e.g., pricing for a seat ticket at a concert) to be retrieved and overlaid on a live video of a person broadcasting the concert from that seat. Other context, such as weather sources, game scores and additional event data may be similarly accessed by embodiments to provide a rich user experience based on video that is verified in real time to be authentically captured.

Thus, a first embodiment is a device comprising a data port, a decoder, a video frame store, a sensor data store, a first delta detection circuit, a second delta detection circuit, and a condition evaluation circuit.

The data port is configured to receive data from a client device of an individual using a data communication network.

The decoder is coupled to the data port, and is configured to decode data received from the client device according to a movie container format. The received data include at least (a) a sequence of video frames depicting a physical environment between a start time and an end time, and (b) sensor data collected between the start time and the end time by one or more sensors of the client device.

The video frame store is coupled to the decoder, and is configured to store the sequence of video frames.

The sensor data store is coupled to the decoder, and is configured to store the sensor data.

The first delta detection circuit is coupled to the video frame store, and is configured to identify video frames in the video frame store whose depictions change in accordance with a first change in a physical state of the client device at a first time.

The second delta detection circuit is coupled to the sensor data store, and is configured to identify values of stored sensor data that represent a second change in the physical state of the client device at a second time.

The condition evaluation circuit is coupled to the first delta detection circuit and to the second delta detection circuit, and is configured to determine existence of either a valid condition or an anomalous condition for the data produced by the client device. The valid condition exists when both (a) the first change and the second change are determined to represent the same change in the physical state of the client device, and (b) the first time and the second time are consistent with a timing of that same change. The anomalous condition exists otherwise; i.e., if either of these two valid conditions is not met.

The data port is further configured to transmit, using the data communication network after receiving a signal from the condition evaluation circuit determining existence of the valid condition, data attesting to the veracity of the sequence of video frames.

In some embodiments, the data port receives the data using the Internet, and the client device of the individual comprises a smartphone.

In some embodiments, the data port receives the data as a data stream or as a data file, formatted according to an MP4 standard, and the decoder decodes the data according to the MP4 standard.

In some embodiments, the sensor data store is configured to store one or more of: global positioning system (GPS) data, or accelerometer data, or gyroscope data, or magnetometer data.

In some embodiments, the first delta detection circuit, or the second delta detection circuit, or both are configured to identify a change in the client device of one or more of: a physical location, or a velocity, or an acceleration, or an angular orientation.

Some embodiments also include a machine learning model that categorizes correlated changes between video frames with changes in values of sensor data, and the condition evaluation circuit is configured to determine existence of either the valid condition or the anomalous condition by providing the video frames and the sensor data to the machine learning model.

In some embodiments, the condition evaluation circuit is further configured to determine existence of the valid condition when the sequence of video frames includes steganographic data, or to determine the existence of the anomalous condition when the sequence of video frames lacks the steganographic data.

Some embodiments also include an attestation circuit configured to generate the data attesting to the veracity of the sequence of video frames.

In some embodiments, the data port is configured to transmit the data attesting to the veracity of the sequence of video frames to a second client device of a second individual, thereby causing the second client device to communicate the veracity of the sequence of video frames to the second individual before or during display of the sequence.

In some embodiments, the data port is further configured to transmit, using the data communication network, data relating to the anomalous condition for display on the client device after the condition evaluation circuit determines existence of the anomalous condition.

Another embodiment is a method comprising several processes performed by a computing device, which may be the device just described or some other computing device.

Thus, a first process includes receiving, from a client device of an individual by a computing device using a data communication network, data produced by the client device according to a container format, the data including at least (a) a sequence of video frames depicting a physical environment between a start time and an end time, and (b) sensor data collected between the start time and the end time by one or more sensors of the client device.

A second process includes identifying, by the computing device, video frames whose depictions change in accordance with a first change in a physical state of the client device at a first time.

A third process includes identifying, by the computing device, values of the sensor data that represent a second change in the physical state of the client device at a second time.

A fourth process is determining, by the computing device, existence of either a valid condition or an anomalous condition for the data produced by the client device, wherein the valid condition exists when both (a) the first change and the second change are determined to represent the same change in the physical state of the client device, and (b) the first time and the second time are consistent with a timing of that same change, and wherein the anomalous condition exists otherwise.

And a fifth process includes transmitting, by the computing device using the data communication network after determining existence of the valid condition, data attesting to the veracity of the sequence of video frames.

In some embodiments, receiving comprises receiving using the Internet, and the client device of the individual comprises a smartphone.

In some embodiments, receiving comprises receiving the data produced by the client device as a data stream or as a data file, formatted according to an MP4 standard.

In some embodiments, receiving comprises receiving the sensor data as one or more of: global positioning system (GPS) data, or accelerometer data, or gyroscope data, or magnetometer data.

In some embodiments, identifying the first change or the second change in the physical state of the client device includes identifying a change in the client device of one or more of: a physical location, or a velocity, or an acceleration, or an angular orientation.

In some embodiments, determining existence of either the valid condition or the anomalous condition comprises providing the video frames and the sensor data to a machine learning model that categorizes correlated changes between video frames with changes in values of sensor data.

In some embodiments, determining existence of the valid condition comprises determining that the sequence of video frames includes steganographic data, or determining the existence of the anomalous condition comprises determining that the sequence of video frames lacks the steganographic data.

Some embodiments also include generating the data attesting to the veracity of the sequence of video frames.

In some embodiments, transmitting comprises transmitting the data attesting to the veracity of the sequence of video frames to a second client device of a second individual, thereby causing the second client device to communicate the veracity of the sequence of video frames to the second individual before or during display of the sequence.

Some embodiments also include transmitting, by the computing device using the data communication network, data relating to the anomalous condition for display on the client device after determining existence of the anomalous condition.

It is appreciated that the concepts, techniques, and structures disclosed herein may be embodied in other ways, including as software in tangible, computer-readable storage media, and that the above summary of disclosed embodiments is thus meant to be illustrative rather than comprehensive or limiting. In particular, individual elements of different embodiments described herein may be combined to form other embodiments not specifically set forth above. Various elements, which are described in the context of a single embodiment, also may be provided in other embodiments separately, or in any suitable sub-combination. Moreover, other embodiments not specifically described herein also may be within the scope of the claims set forth below.

DESCRIPTION OF THE SEVERAL VIEWS OF THE DRAWINGS

The manner and process of making and using the disclosed embodiments may be appreciated by reference to the drawings, not necessarily to scale, in which.

DETAILED DESCRIPTION OF EMBODIMENTS

Figure 1:
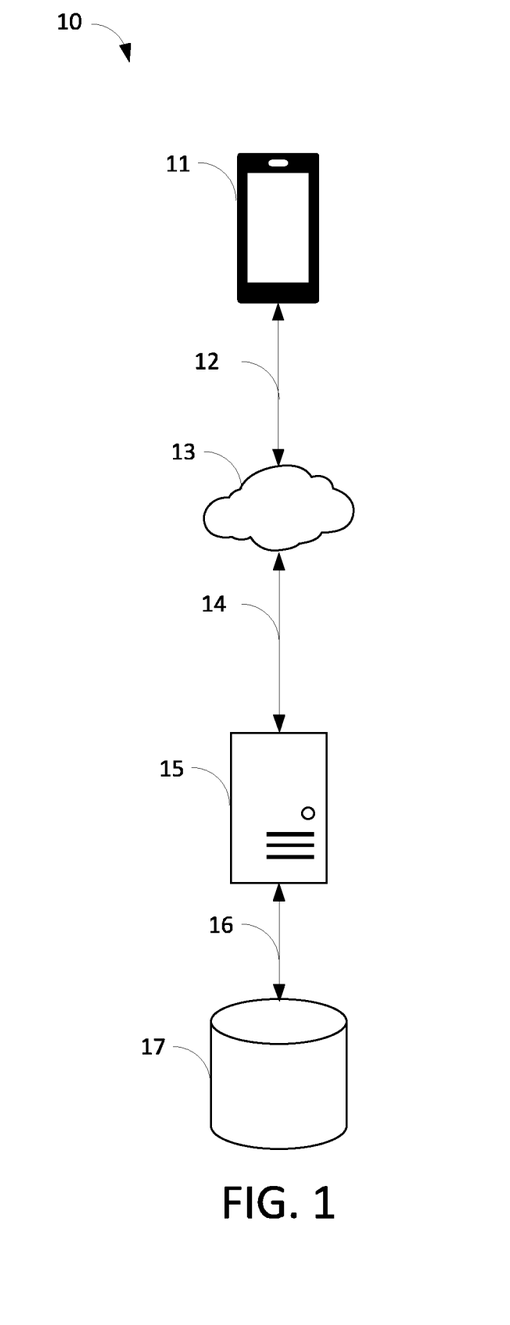
FIG. 1 schematically shows a typical client-server system in which the disclosed concepts, structures, and techniques may be advantageously embodied.

FIG. 1 schematically shows a typical client-server system in which the disclosed concepts, structures, and techniques may be advantageously embodied. In accordance with client-server principles, the system 10 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, the system 10 includes a client device 11. The client device 11 is illustrated as a smartphone, but may be any electronic device known in the art, including without limitation a laptop computer, tablet computer, desktop computer, embedded system, or any other device capable of transmitting and receiving data, and requesting that another electronic device perform a computation.

The client device 11 is coupled, via a data link 12, to a data communication network 13. The data link 12 is any combination of hardware or software suited for communicating data between the client device 11 and other electronic devices via the data communication network 13. The data link 12 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

The data communication network 13 is any combination of hardware or software suited for communicating data between electronic devices via data links. The data communication network 13 may include, for example, a local area network ("LAN"), a wide area network ("WAN"), a metropolitan area network ("MAN"), a virtual private network ("VPN"), the Internet, or any other type of data network or combination of networks.

It is appreciated that a data communication network 13 operates to mediate data communication between multiple electronic devices. Thus, the depiction of only a single client device 11 in FIG. 1 is merely illustrative, and a typical system 10 may have any number of client devices coupled for data communication using corresponding data links to the data communication network 13. It is also appreciated that the data communication network 13 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

The data communication network 13 allows the client device 11 to communicate with a server device 15, which is coupled to the data communication network 13 using a data link 14. The data link 14 is any combination of hardware or software suited for communicating data between the server device 15 and other electronic devices via the data communication network 13. The server device 15 may be any electronic device known in the art that is capable of transmitting and receiving data, and performing a computation on behalf of another electronic device.

Again, the data communication network 13 operates to mediate data communication between multiple electronic devices. Thus, the depiction of only a single server device 15 in FIG. 1 is merely illustrative, and a typical system 10 may have any number of server devices coupled for data communication using corresponding data links to the data communication network 13. In particular, to provide simultaneous service to large numbers of client devices, a particular computation (or type of computation, such as rendering a web page) may be allocated to one of multiple server devices using a load balancer or other device. It is further appreciated that the server device 15, along with additional server devices if required, may provide well-defined operations known as "services" according to a service-oriented architecture ("SOA"), as those terms are known in the art.

It is appreciated in accordance with client-server principles that the designation of device 11 as the "client device" and device 15 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of the system 10, namely that the client device 11 is the device requesting that a particular computation be performed on behalf of a user thereof, and that the server device 15 operates a "service" to perform the computation and communicate the results to the client device 11. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 1 shows the server device 15 coupled, via a storage link 16, to a data storage device 17. The data storage device 17 may be a database, file system, volatile or non-volatile memory, network attached storage ("NAS"), storage area network ("SAN"), or any other hardware or software that is capable of storing data used by a server device 15 or a service executing thereon. The storage link 16 may be any hardware or software capable of communicating data between the server device 15 and the data storage device 17. It is appreciated that, where more than one server device 15 is present, multiple server devices may communicate with the same data storage device 17 to provide data sharing between the server devices.

It is appreciated that a requested computation may be done in several parts, thereby requiring the system 10 to retain an intermediate computational state between requests. If the services provided by the server device 15 do not store any such state (for example, to simplify their design), then the client device 11 must supply all state with each request. This type of communication may be provided using the representational state transfer ("REST") client-server architecture. In addition to being a stateless client-server architecture, REST systems permit responses to requests with identical inputs to be cached to improve response time; permit layering of services, thereby multiplying available functionality; permit services to require clients to perform some computation locally to improve performance; and provide a uniform interface for all client devices. In some embodiments, the client device does not rely on a choice of server device to provide a desired service. In such cases, the service may be provided using a function-as-a-service (FaaS) architecture, such as the AWS LAMBDA "serverless" compute platform developed by Amazon Web Services, Inc. of Seattle, WA.

Figure 2:
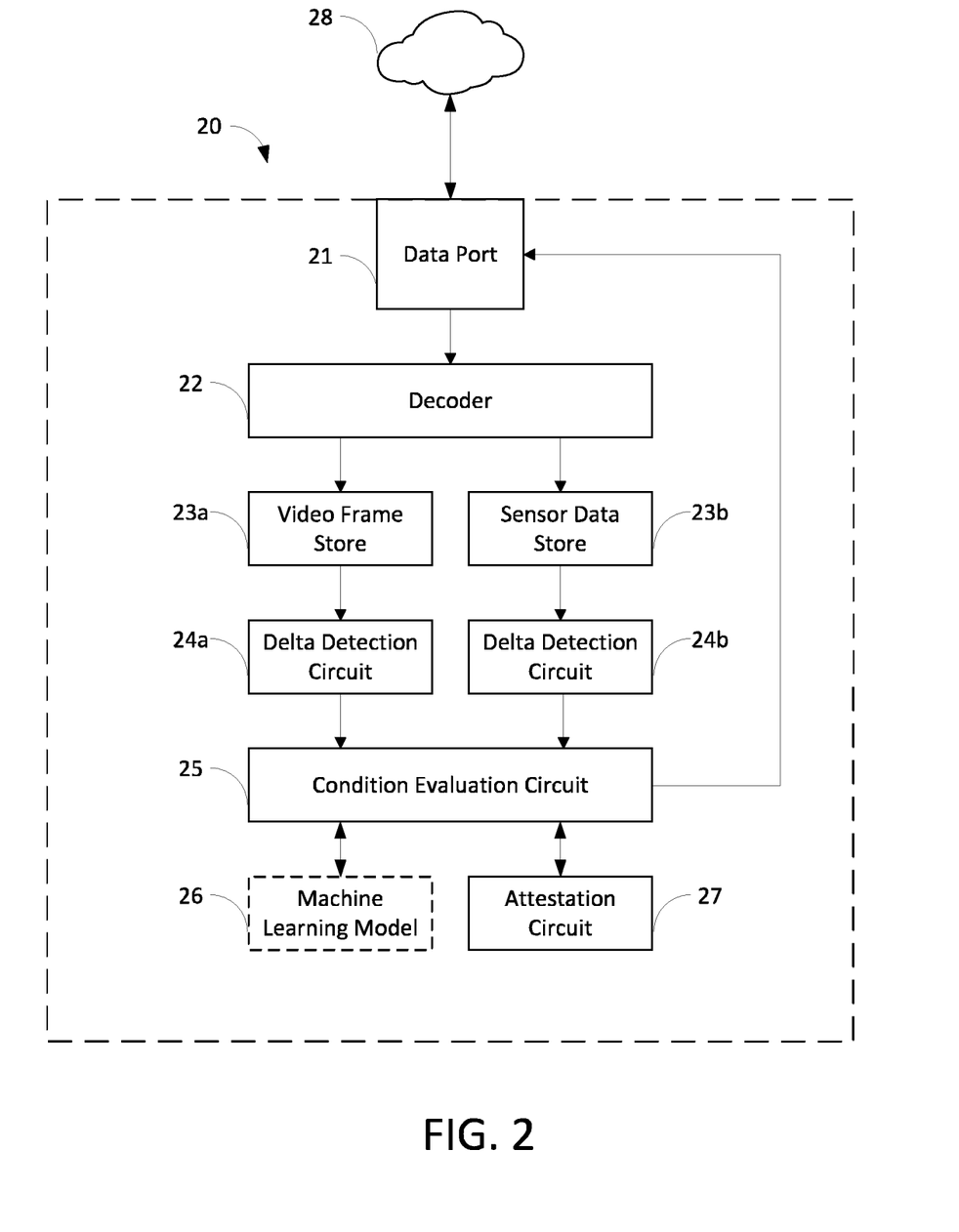
FIG. 2 schematically shows relevant components of a device in accordance with a first embodiment, and their respective relationships.

FIG. 2 schematically shows relevant components of a device 20 in accordance with a first embodiment, and their respective relationships. The device 20 includes a data port 21, a decoder 22, a video frame store 23a, a sensor data store 23b, a first delta detection circuit 24a, a second delta detection circuit 24b, a condition evaluation circuit 25, an optional machine learning model 26, and an attestation circuit 27. The device 20 is coupled to a data communication network 28, which may be the data communication network 13, and which in turn is coupled to a client device of an individual and possibly other devices (not shown). The device 20 may be standalone, or may be implemented as one or more server devices, such as server device 15.

The data port 21 provides the device 20 with a communications interface, and is configured to receive data from a client device (e.g., a smartphone, or other client device 11) of an individual using the data communication network 28 (e.g., the Internet, or other network 13). The data port 21 may be implemented using any standard technology for such data communication, such as a wired or wireless network card, and may be configured using techniques well known in the art of data networking.

To facilitate creation of video data for transmission to the device 20, the client device may provide the individual with a front-end app that generates a raw video stream and accesses associated sensor data (which act as metadata with respect to the video footage and are thus sometimes referred to herein as "sensor metadata"). These data are formatted in a container file in accordance with embodiments, and in particular may be timestamped. In this connection, the front-end app may include (or programmatically access) a video encoder and application programming interfaces (APIs) that provide sensor data. The app may also provide a graphical user interface (GUI) showing video from a camera as it is being recorded and/or streamed to the device 20. The GUI may include overlays that display the collected sensor data, to reassure the individual that the client device is producing sufficient data to validate the video in real-time. Such overlays may take the form of simple text, or integrate with other apps such as mapping apps to combine GPS data and gyroscopic data as a directional icon on a moving location display. The app may include additional, computed metadata such as digital signatures or hashes of movie fragments, to permit the device 20 to verify that the received movie file has been properly received and has not been altered during transmission. The app also may inject steganographic (invisible) data into the video frames it records, to enable the device 20 to determine that the file was created using the app and not some other software. The app may include other beneficial features that are outside the scope of this disclosure. The front-end app may be created using commercially-available software, such as the REACT NATIVE framework developed by Meta Platforms, Inc. of Menlo Park, CA, or using other appropriate techniques of software development.

The decoder 22 is coupled to the data port 21 and is configured to decode data received from the client device according to a movie container format. Thus, data received in the data port 21 from the client device that is in other formats need not be passed to the decoder 22. The movie container format may be in the MOV format, or the MP4 format, or any other suitable video data format, and the data may be received as a data stream or a data file. The MP4 standard format is discussed extensively herein, not to limit the scope of embodiments, but to provide sufficient detail to enable implementation of at least one embodiment. In this connection, the decoder 22 may be implemented using any device capable of decoding movies having the relevant container format, including without limitation an application-specific integrated circuit (ASIC), a field-programmable gate array (FPGA), or a system-on-a-chip (SoC).

The received data may be streamed from the data port 21 to the decoder 22, or it may be received or downloaded as a complete file by the data port 21 (e.g., using a data storage device such as data storage device 17) and passed whole to the decoder 22. Regardless of the means by which the decoder receives the movie data, those data include at least a sequence of video frames depicting a physical environment between a start time and an end time, i.e., a video. In connection with MP4, those video frame data are stored in "mdat" boxes. Additionally, in accordance with embodiments of the concepts, techniques, and structures first described herein, the received data also include sensor data collected between the start time and the end time by one or more sensors of the client device. These additional data may be contained within "udta" boxes, and more specifically within nested "meta" boxes, as described more fully below in connection with FIG. 4.

The video frame store 23a is coupled to the decoder 22 to store video frames from the sequence, in viewing order. The video frames may be extracted from "mdat" boxes, and might be I-frames, P-frames, or B-frames as relevant. Likewise, the sensor data store 23b is coupled to the decoder 22 to store sensor data received as part of the movie file. The sensor data may be extracted from "udta" boxes, and may include, without limitation, global positioning system (GPS) data, or accelerometer data, or gyroscope data, or magnetometer data. The video frame store 23a and sensor data store 23b each may be implemented, for example, as a buffered data store.

If B-frames with reverse (i.e., future) prediction are used in the movie, the video frames may be received out of viewing order. In such cases, the decoder 22 will rearrange them into correct viewing order prior to sending them to the video frame store 23a. In doing so, the decoder 22 will naturally reorder the sensor data so that they correspond to their respective, contemporaneous video frames. To facilitate processing of video data and sensor metadata following such reordering, the video frames and/or the sensor data may include timestamps as noted above.

The first delta detection circuit 24a is coupled to the video frame store 23a, and is configured to identify video frames whose depictions change in accordance with a first change in a physical state of the client device at a first time. Similarly, the second delta detection circuit 24b is coupled to the sensor data store 23b, and is configured to identify values of stored sensor data that represent a second change in the physical state of the client device at a second time. The relevant physical state of the client device may include, by way of illustration and not limitation, a physical location, or a velocity, or an acceleration, or an angular orientation.

Both the first delta detection circuit 24a and the second delta detection circuit 24b may be implemented using conventional circuitry (including a programmed computer processor). However, the first delta detection circuit 24a detects changes ("deltas") in what is depicted by successive video frames, while the second delta detection circuit 24b detects changes ("deltas") in sensor data that correspond to those video frames. Thus, their respective operations are quite differently implemented, and are separately described below.

The first delta detection circuit 24a may identify video frame deltas using several techniques. As a simple example, the first delta detection circuit 24a may simply compare two successive video frames, pixel by pixel, to determine any changes that correspond to a change in the client device—as opposed to a change in the depicted scene. Alternately, the first delta detection circuit 24a may identify whether a subsequent frame is a P-frame or a B-frame and look for the presence of motion vectors. If a motion vector exists, then that motion vector may be interpreted as, e.g., a pan or zoom or tilt of the camera.

The second delta detection circuit 24b, by contrast, identifies sensor data deltas depending on the type of data. Thus, for example, GPS deltas may arise in the form of changes in latitude and longitude of the client device, and in particular give rise to the calculation of velocity vectors that have been experienced by the camera device. Similarly, accelerometer deltas may take the form of non-zero accelerations of the client device, which may otherwise be held steady (zero acceleration) to stabilize the camera. And magnetometer or gyroscopic data may take the form of angular accelerations, which may be read directly from their respective sensors.

The condition evaluation circuit 25 is coupled to the first delta detection circuit 24a and to the second delta detection circuit 24b. The condition evaluation circuit 25 is configured to determine existence of either a valid condition or an anomalous condition for the data produced by the client device, which may be implemented using conventional circuitry (including a programmed computer processor). Broadly, the valid condition occurs when the video data and the simultaneously-sampled sensor data "make sense" together, in that they both plausibly represent a scene that was directly imaged by a client device containing a camera and the relevant sensors (as opposed to digitally manipulated). When these data do not align, one may be suspicious that either the video data or the sensor data have been altered, and the anomalous condition obtains.

More concretely, in accordance with embodiments of the concepts, techniques, and structures disclosed herein, the valid condition exists when both (a) the first change and the second change are determined to represent the same change in the physical state of the client device, and (b) the first time and the second time are consistent with a timing of that same change. Condition (a) represents the constraint that the video data and the sensor data both register values indicative of a particular change in the physical state (e.g., physical location, velocity, acceleration, or angular orientation) of the client device. That is, the client device has moved and both the video data and sensor data reflect that movement. Condition (b) represents the constraint that the video data and the sensor data reflect a particular movement at a particular time. That is, similar deltas may be obtained at different times (e.g., if the client device is moved repetitively), and the deltas being compared should correspond to the change in physical state at a particular time.

The first time and the second times of a particular client device movement may not be identical in the data, if the frequency at which video frames are generated differs from the frequency at which data are sampled from various sensors in the client device, or if there are relative delays in the respective collection processes on the client device. However, the first time and the second time should be substantially the same (as reflected in their respective timestamps) if the video recording is genuine and not post processed. In some embodiments, sensors are sampled within a few milliseconds (e.g., less than 1 ms, 5 ms, or 10 ms) of each video frame capture to ensure that the sensor data accurately reflect any movement depicted in the frame.

Given an unedited video and recorded GPS, accelerometer, and magnetometer metadata from the client device that recorded the video, it is possible to make a statement about the authenticity of the video. If the video shows movement along a path (e.g., walking down a street), the condition evaluation circuit 25 may examine the GPS data for corresponding changes in latitude and longitude. If a person appears to have traveled a city block in a video, the corresponding GPS metadata should confirm this. That is, the GPS data should show a continuous and logical progression that matches the path shown in the video. Sudden jumps or inconsistencies in GPS data compared to the visual path would indicate an anomalous condition. Similarly, if the video depicts motion, such as a person driving, that motion should be captured in the GPS. If the vehicle stopped at a red light, the GPS would reflect being relatively stationary during precisely the same times as the video indicates as much.

Analogously, if the client device (or more particularly, its camera) is raised or lowered, turned right to left, or moved at all, an internal accelerometer in the camera may record all of this movement. This data is then analyzed and correlated with deltas obtained from the video by the condition evaluation circuit 25. As an example, if a camera were held up to get a clearer view of the action being recorded, the accelerometer metadata should show vertical motion at the appropriate time (as indicated by the timestamps in both the relevant video frames and the accelerometer data).

Similarly, magnetometer readings may be used to determine client device orientation. The condition evaluation circuit 25 first notes an initial orientation of the camera using the magnetometer data (e.g., facing north), which is used as a baseline against which to judge deltas. Next, as the video shows the camera panning, the validator expects a corresponding change in the magnetometer readings. For instance, a pan to the left should show a change in orientation from north to north northwest, to northwest, to west northwest, to west.

In some embodiments, the condition evaluation circuit 25 uses an optional machine learning model 26 that categorizes correlated changes between video frames with changes in values of sensor data, such as those just described. The machine learning model 26 is coupled to the condition evaluation circuit 25, which provides the video frames and the sensor data to the machine learning model 26. The machine learning model 26 may be implemented using standard machine learning hardware and/or software, including the AMAZON REKOGNITION cloud-based video analysis software developed by Amazon Web Services, Inc. of Seattle, WA. The description below frames the model 26 training as using human-validated videos (e.g., via supervised learning), although it is contemplated that unsupervised learning (including adaptive learning) may be used in some embodiments. Moreover, it should be appreciated from this description that in some embodiments the machine learning model 26 is physically incorporated into the device 20, but in others it is in data communication with the device 20. In latter such embodiments of the device 20, the data port 21 (or another data port, not shown) may be used to communicate with the machine learning model 26 using techniques known in the art.

The machine learning model 26 may analyze not only the raw metadata values but also the deltas between successive video frames. In particular, timestamped GPS, magnetometer, and accelerometer data may be combined with the similarly timestamped video frame data to form a point in a multi-dimensional state space. Valid correlations correspond to identifiable clusters of points in the state space that can be assigned to particular changes in the physical state of the client device (i.e., movements of the client device), while invalid correlations correspond to randomly scattered points.

In more complex embodiments, the comparisons may be made according to a level of granularity in recognition of the non-exact alignment of the timestamps on the available data. Thus, for instance, the data may be considered valid so long as the timestamps are within a margin of error, such as one second, one half-second, or the duration of one video frame (e.g. 1/29.97 seconds for "30 Hz" video). Combining video frame data and sensor metadata according to this uncertainty will produce multiple points, and the valid condition may be obtained if enough of these points lie within a particular cluster.

The machine learning model 26 may detect anomalies in delta patterns. For instance, if the magnetometer data does not reflect the expected change during a pan, or if the GPS data does not align with the visual path taken in the video, the machine learning model 26 may indicate the discrepancy to the condition evaluation circuit 25. The latter circuit, in turn, may use this information to signal an anomalous condition.

The machine learning model 26 may provide real time feedback on the consistency between the metadata deltas and video content, facilitating quick validation decisions.

And, the machine learning model 26 may be configured, using techniques known in the art, to adapt to more complex scenarios, like nonlinear paths or erratic camera movements, improving its reliability and accuracy in various real world situations. Indeed, erratic camera movements matched by metadata are a strong indicator of validity.

The condition evaluation circuit 25 may determine veracity of the video based on information other than (or in addition to) that provided by the machine learning model 26. Thus, for example, the condition evaluation circuit 25 may be configured to determine existence of the valid condition when the sequence of video frames includes steganographic data, or to determine the existence of the anomalous condition when the sequence of video frames lacks the steganographic data. As is known in the art, steganographic data are "hidden" data, and in this context represent pixels or macroblocks that are modified by the client device in a manner not detectable by the human eye but detectable by the device 20 (and in particular by the delta detection circuit 24*a*). Such modifications may include, for example, artificially setting the lowest bits of certain pixel red-green-blue (RGB) values so that, when those bits are extracted and decoded from particular video frames, they form a desired secret message (e.g., the name of a company or a particular number). If such data are not found in the correct video frames, the condition evaluation circuit 25 may reasonably conclude that the received video frames were not obtained using methods compatible with the device 20, and signal an anomalous condition.

The condition evaluation circuit 25 is coupled to an attestation circuit 27 configured to generate data attesting to the veracity of the sequence of video frames. Such data may take any form known in the art of data security, such as a digital signature applied to a relevant video frame or sequence of such frames. The condition evaluation circuit 25 may invoke generation of such data according to criteria that are configured in connection with desired operational parameters of the device 20.

Attestation data-whether signaling a valid condition or an anomalous condition may be stored appropriately by the device 20 in the received container format. Thus, the condition evaluation circuit 25 and attestation circuit 27 may be configured to attest a completed video file as a whole by storing attestation data in a file-scoped data structure within the container. Alternately, if one desires that each frame of video be attested during a live streamed event, these circuits 25, 27 may be so configured to store attestation data on a per-frame basis.

The condition evaluation circuit 25 may communicate the attested video data back to the data port 21 for subsequent rebroadcast (in the case of a live streamed event) or re-storage (in the case of a video file read from data storage). In connection with live streaming, the data port 21 may be configured to transmit the data attesting to the veracity of the sequence of video frames to a second client device of a second individual, thereby causing the second client device to communicate the veracity of the sequence of video frames to the second individual before or during display of the sequence. In this way, many individuals watching a stream may be assured that the video is genuine.

Or the data port 21 may be configured to transmit, using the data communication network, data relating to the anomalous condition for display on the client device after the condition evaluation circuit 25 determines existence of the anomalous condition. Thus, the individual recording the video may be notified that something is amiss, allowing them to take corrective measures such as recalibrating their movement sensors.

In either case, the data port may be configured to transmit, using the data communication network after receiving a signal from the condition evaluation circuit 25 determining existence of the valid condition, data attesting to the veracity of the sequence of video frames. As described above, these data may be merged with the received movie container file in such transmission.

Figure 3:
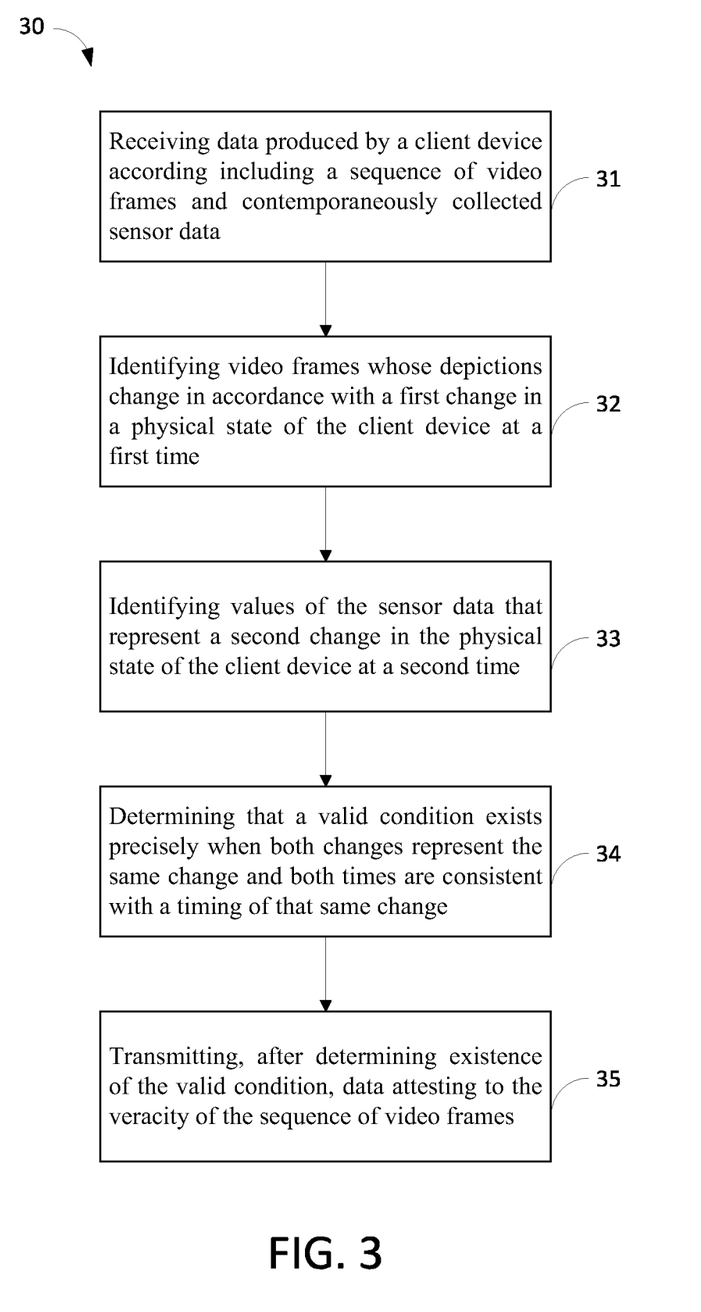
FIG. 3 is a flow diagram for a method in accordance with a second embodiment.

FIG. 3 is a flow diagram for a method 30 in accordance with a second embodiment for performance by a computing device. The method 30 may be performed by the server device 15 shown in FIG. 1, or the device 20 shown in FIG. 2, or any other suitable computing device that comprises hardware, software, or a combination thereof. While the processes of the method 30 are shown in a particular order, it is contemplated that some processes (especially processes 32 and 33 described below) may be performed simultaneously, especially via parallel processing techniques, to reduce the total time required to implement the method 30. In particular, reducing the processing time may be advantageous or necessary to provide real time feedback to an individual recording video on a client device.

The method 30 begins with a process 31 that includes receiving, from a client device of an individual by a computing device using a data communication network, data produced by the client device according to a container format, the data including at least (a) a sequence of video frames depicting a physical environment between a start time and an end time, and (b) sensor data collected between the start time and the end time by one or more sensors of the client device. The process 31 may be illustratively implemented by the data port 21 shown in FIG. 2 or any other suitable machine.

The method 30 continues with a process 32 that includes identifying, by the computing device, video frames whose depictions change in accordance with a first change in a physical state of the client device at a first time. The process 32 may be illustratively implemented by the decoder 22, video frame store 23a, and delta detection circuit 24a shown in FIG. 2 or any other suitable machine.

The method 30 likewise includes a process 33 that includes identifying, by the computing device, values of the sensor data that represent a second change in the physical state of the client device at a second time. The process 33 may be illustratively implemented by the decoder 22, sensor data store 23b, and delta detection circuit 24b shown in FIG. 2 or any other suitable machine.

The method 30 then advances to a process 34 that includes determining, by the computing device, existence of either a valid condition or an anomalous condition for the data produced by the client device, wherein the valid condition exists when both (a) the first change and the second change are determined to represent the same change in the physical state of the client device, and (b) the first time and the second time are consistent with a timing of that same change, and wherein the anomalous condition exists otherwise. The process 34 may be illustratively implemented by the condition evaluation circuit 25 (and optionally, the machine learning model 26) shown in FIG. 2, or any other suitable machine.

The method 30 concludes with a process 35 that includes transmitting, by the computing device using the data communication network after determining existence of the valid condition, data attesting to the veracity of the sequence of video frames. The process 35 may be illustratively implemented by the attestation circuit 27 and the data port 21 shown in FIG. 2, or any other suitable machine.

Details regarding implementation of individual processes in the method 30 may be found above in the descriptions of the respective components shown in FIG. 2. In particular, specific implementation details and refinements described above (e.g., the use of the MP4 container format to hold the received data in process 31) are contemplated to apply straightforwardly to the method 30 as a description of the use of the device 20, and all of those details and refinements are omitted here for brevity. However, it is also contemplated that those details and refinements may be implemented on devices other than those constructed exactly according to FIG. 2 and as described above in that connection.

Figure 4:
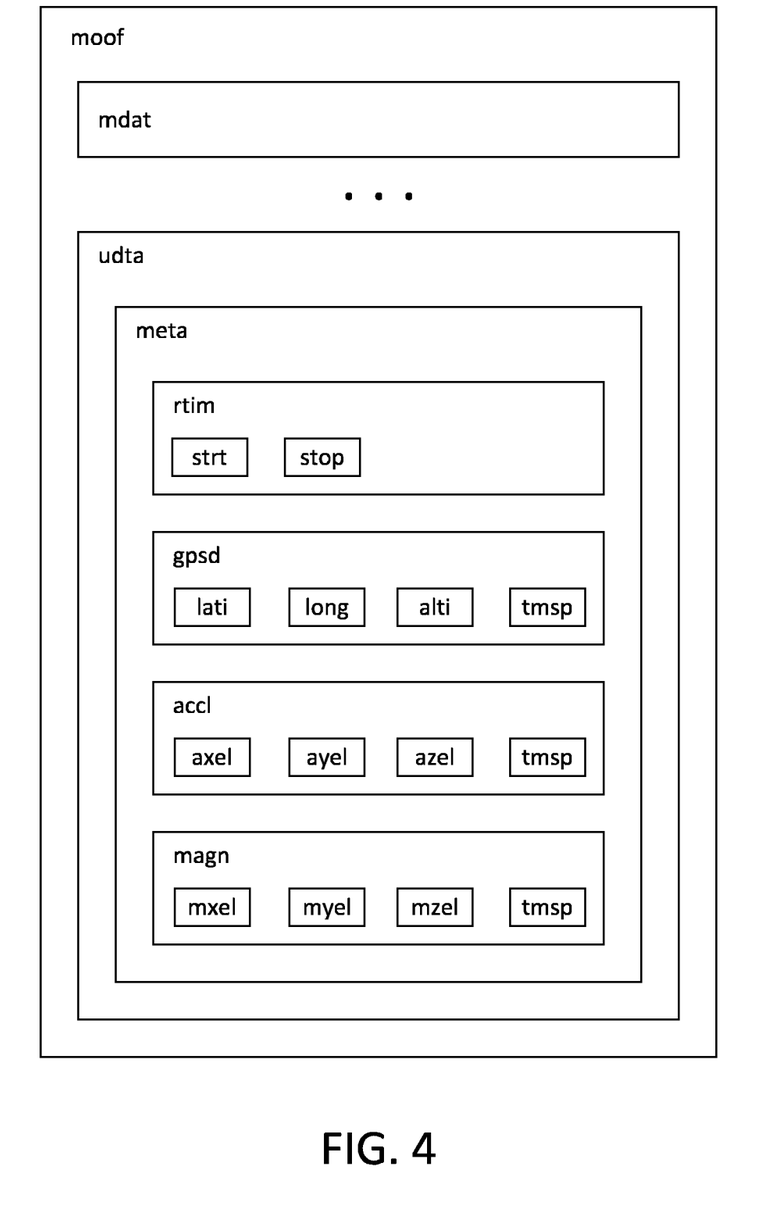
FIG. 4 illustrates a data structure diagram for an implementation of a media container format in accordance with various embodiments.

FIG. 4 illustrates a data structure diagram for an implementation of a media container format in accordance with various embodiments. The MP4 container format is described in more detail for concreteness, but it is contemplated that other formats may be used in accordance with embodiments. More particularly, FIG. 4 shows an MP4 format using streamed movie data (which contains movie fragment, or "moof" boxes) rather than stored movie data (which does not). Thus, the data structure illustrated by FIG. 4 may be used by a device, such as server device 15 of FIG. 1 or device 20 of FIG. 2, to implement the method 30 shown in FIG. 3 on streamed video data, thereby enabling real time feedback during the video recording process, as described above.

As is known in the art, a "moof" box may include several other boxes, including movie data ("mdat") boxes. Several mdat boxes may be nested within a single moof box, as represented by the ellipsis. According to the MP4 specification, a moof box may also include a user data ("udta") box that permits an implementation to add non-standardized data. In accordance with embodiments of the concepts, techniques, and structures disclosed herein, the udta box may include a "meta" box to hold sensor metadata, including without limitation GPS data, accelerometer data, and magnetometer data collected from the device that captured the video. Data stored in this way maintains backwards compatibility, and MP4 files that include these data may be read and played by software that does not support the extended data. However, to access and use the embedded sensor data, software must specifically support the extended file format.

The depicted boxes are now described in more detail with reference to a particular implementation, in which box names follow the industry standard four-character code ("FourCC") format and various units for stored values are provided. It is contemplated that other embodiments may use different naming conventions or units.

The illustrated "meta" box includes a recording time ("rtim") box that stores the recording's start and stop times. The start time box ("strt") may be implemented as a 64-bit unsigned integer representing the time (e.g., in milliseconds since the Unix epoch) when the recording began. Similarly, the stop time box ("stop") may be a 64-bit unsigned integer representing the time when the recording ended. For streamed data, these start and stop times may pertain to only the data contained within the surrounding moof box, while for stored data they may pertain to the entire movie.

The meta box includes a global positioning system (GPS) data box ("gpsd") to store GPS data associated with the recorded video. These data may include a latitude ("lati") stored as a double precision floating point, representing the latitude in decimal degrees. The GPS data may include a longitude ("long") stored as a double precision floating point, representing the longitude in decimal degrees. The GPS data may include an altitude ("alti") stored as a floating point number, representing meters above sea level. And each set of GPS data may contain a timestamp ("tmsp") stored as a 64-bit unsigned integer representing milliseconds since the start of the recording.

The meta box includes an accelerometer data box ("accl") to store accelerometer data. The accl box may include X-axis data ("axel"), Y-axis data ("ayel"), and Z-axis data ("azel"), each representing an acceleration of the client device in meters per second squared ($m/s^2$). These three data may be viewed logically, or stored physically, as an array of floating point numbers. Similar to the gpsd box, each set of accelerometer data may have an associated timestamp ("tmsp") stored as a 64-bit unsigned integer representing milliseconds since the start of the recording.

The meta box includes a magnetometer data box ("magn") to store magnetometer data. The magn box may include X-axis data ("mxel"), Y-axis data ("myel"), and Z-axis data ("mzel"), each representing a detected magnetic field strength (e.g., with respect to the Earth's ambient magnetic field) in microteslas ($\mu T$) and which together determine an orientation of the client device. These three data may be viewed logically, or stored physically, as an array of floating point numbers. Similar to the gpsd and accl boxes, each set of magnetometer data may have an associated timestamp ("tmsp") stored as a 64-bit unsigned integer representing milliseconds since the start of the recording.

The illustrative data structure of FIG. 4. shows four different types of metadata, including three types of sensor metadata. It is contemplated that, as the capabilities of client devices evolve (i.e., as more sensors become widely available), the data structure will evolve accordingly. Thus, more boxes can be added within the meta box to accommodate new data types or features without disrupting the primary structure. Conversely, various client devices may not have all of the sensors described above, or a particular individual may not have authorization to access all of the sensor data. It is therefore contemplated that fewer sensor metadata boxes may be present within the meta box of any given container format in accordance with embodiments.

Figure 5:
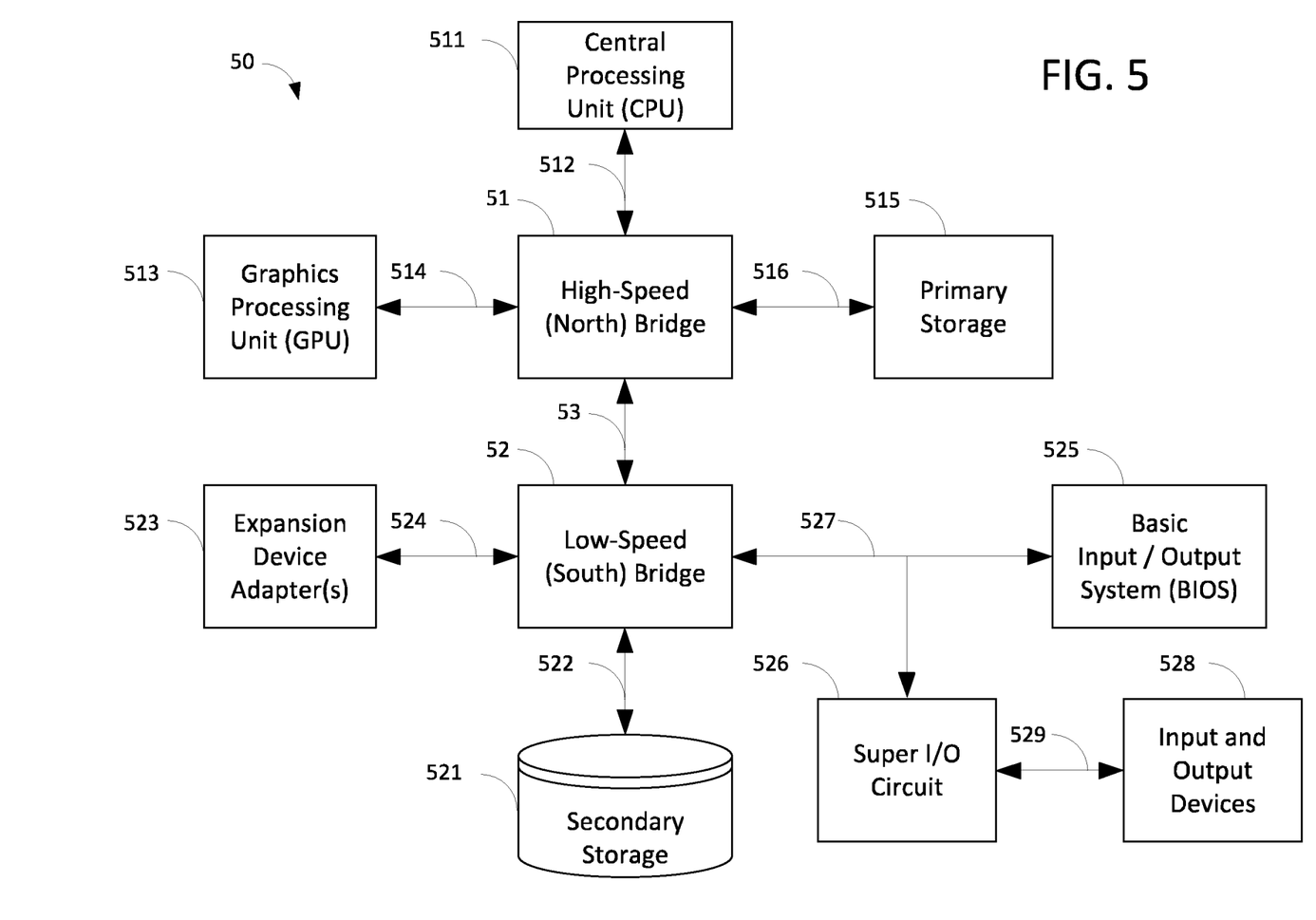
FIG. 5 schematically shows relevant physical components of a computer that may be used to embody the concepts, structures, and techniques disclosed herein.

FIG. 5 schematically shows relevant physical components of a computer 50 that may be used to embody the concepts, structures, and techniques disclosed herein. In particular, the computer 50 may be comprise, in whole or in part, the client device 11, the server device 15, or the device 20, and may be used to implement the method 30. Generally, the computer 50 has many functional components that communicate data with each other using data buses. The functional components of FIG. 5 are physically arranged based on the speed at which each must operate, and the technology used to communicate data using buses at the necessary speeds to permit such operation.

Thus, the computer 50 is arranged as high-speed components and buses 511 to 516 and low-speed components and buses 521 to 529. The high-speed components and buses 511 to 516 are coupled for data communication using a high-speed bridge 51, also called a "northbridge," while the low-speed components and buses 521 to 529 are coupled using a low-speed bridge 52, also called a "southbridge."

The computer 50 includes a central processing unit ("CPU") 511 coupled to the high-speed bridge 51 via a bus 512. The CPU 511 is electronic circuitry that carries out the instructions of a computer program. As is known in the art, the CPU 511 may be implemented as a microprocessor; that is, as an integrated circuit ("IC"; also called a "chip" or "microchip"). In some embodiments, the CPU 511 may be implemented as a microcontroller for embedded applications, or according to other embodiments known in the art.

The bus 512 may be implemented using any technology known in the art for interconnection of CPUs (or more particularly, of microprocessors). For example, the bus 512 may be implemented using the HyperTransport architecture developed initially by AMD, the Intel QuickPath Interconnect ("QPI"), or a similar technology. In some embodiments, the functions of the high-speed bridge 51 may be implemented in whole or in part by the CPU 511, obviating the need for the bus 512.

The computer 50 includes one or more graphics processing units (GPUs) 513 coupled to the high-speed bridge 51 via a graphics bus 514. Each GPU 513 is designed to process commands from the CPU 511 into image data for display on a display screen (not shown). In some embodiments, the CPU 511 performs graphics processing directly, obviating the need for a separate GPU 513 and graphics bus 514. In other embodiments, a GPU 513 is physically embodied as an integrated circuit separate from the CPU 511 and may be physically detachable from the computer 50 if embodied on an expansion card, such as a video card. The GPU 513 may store image data (or other data, if the GPU 513 is used as an auxiliary computing processor) in a graphics buffer.

The graphics bus 514 may be implemented using any technology known in the art for data communication between a CPU and a GPU. For example, the graphics bus 514 may be implemented using the Peripheral Component Interconnect Express ("PCI Express" or "PCIe") standard, or a similar technology.

The computer 50 includes a primary storage 515 coupled to the high-speed bridge 51 via a memory bus 516. The primary storage 515, which may be called "main memory" or simply "memory" herein, includes computer program instructions, data, or both, for use by the CPU 511. The primary storage 515 may include random-access memory ("RAM"). RAM is "volatile" if its data are lost when power is removed, and "non-volatile" if its data are retained without applied power. Typically, volatile RAM is used when the computer 50 is "awake" and executing a program, and when the computer 50 is temporarily "asleep", while non-volatile RAM ("NVRAM") is used when the computer 50 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 516 may be implemented using any technology known in the art for data communication between a CPU and a primary storage. The memory bus 516 may comprise an address bus for electrically indicating a storage address, and a data bus for transmitting program instructions and data to, and receiving them from, the primary storage 515. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 50 may use up to $8*2^{32}=32$ gigabytes (GB) of primary storage 515. In this example, the memory bus 516 will have a total width of 64+32=96 bits. The computer 50 also may include a memory controller circuit (not shown) that converts electrical signals received from the memory bus 516 to electrical signals expected by physical pins in the primary storage 515, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 511, the graphics processing units 513, the primary storage 515, and the high-speed bridge 51, or any combination thereof, as a single integrated circuit. In such embodiments, buses 512, 514, 516 may form part of the same integrated circuit and need not be physically separate. Other designs for the computer 50 may embody the functions of the CPU 511, graphics processing units 513, and the primary storage 515 in different configurations, obviating the need for one or more of the buses 512, 514, 516.

The depiction of the high-speed bridge 51 coupled to the CPU 511, GPU 513, and primary storage 515 is merely exemplary, as other components may be coupled for communication with the high-speed bridge 51. For example, a network interface controller ("NIC" or "network adapter") may be coupled to the high-speed bridge 51, for transmitting and receiving data using a data channel. The NIC may store data to be transmitted to, and received from, the data channel in a network data buffer.

The high-speed bridge 51 is coupled for data communication with the low-speed bridge 52 using an internal data bus 53. Control circuitry (not shown) may be required for transmitting and receiving data at different speeds. The internal data bus 53 may be implemented using the Intel Direct Media Interface ("DMI") or a similar technology.

The computer 50 includes a secondary storage 521 coupled to the low-speed bridge 52 via a storage bus 522. The secondary storage 521, which may be called "auxiliary memory", "auxiliary storage", or "external memory" herein, stores program instructions and data for access at relatively low speeds and over relatively long durations. Since such durations may include removal of power from the computer 50, the secondary storage 521 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 522 may be implemented using any technology known in the art for data communication between a CPU and a secondary storage and may include a host adaptor (not shown) for adapting electrical signals from the low-speed bridge 52 to a format expected by physical pins on the secondary storage 521, and vice versa. For example, the storage bus 522 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 50 also includes one or more expansion device adapters 523 coupled to the low-speed bridge 52 via a respective one or more expansion buses 524. Each expansion device adapter 523 permits the computer 50 to communicate with expansion devices (not shown) that provide additional functionality. Such additional functionality may be provided on a separate, removable expansion card, for example an additional graphics card, network card, host adaptor, or specialized processing card.

Each expansion bus 524 may be implemented using any technology known in the art for data communication between a CPU and an expansion device adapter. For example, the expansion bus 524 may transmit and receive electrical signals using a Peripheral Component Interconnect ("PCI") standard, a data networking standard such as an Ethernet standard, or a similar technology.

The computer 50 includes a basic input/output system ("BIOS") 525 and a Super I/O circuit 526 coupled to the low-speed bridge 52 via a bus 527. The BIOS 525 is a non-volatile memory used to initialize the hardware of the computer 50 during the power-on process. The Super I/O circuit 526 is an integrated circuit that combines input and output ("I/O") interfaces for low-speed input and output devices 528, such as a serial mouse and a keyboard. In some embodiments, BIOS functionality is incorporated in the Super I/O circuit 526 directly, obviating the need for a separate BIOS 525.

The bus 527 may be implemented using any technology known in the art for data communication between a CPU, a BIOS (if present), and a Super I/O circuit. For example, the bus 527 may be implemented using a Low Pin Count ("LPC") bus, an Industry Standard Architecture ("ISA") bus, or similar technology. The Super I/O circuit 526 is coupled to the I/O devices 528 via one or more buses 529. The buses 529 may be serial buses, parallel buses, other buses known in the art, or a combination of these, depending on the type of I/O devices 528 coupled to the computer 50.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In illustrative implementations of the concepts described herein, one or more computers (e.g., integrated circuits, microcontrollers, controllers, microprocessors, processors, field-programmable-gate arrays, personal computers, onboard computers, remote computers, servers, network hosts, or client computers) may be programmed and specially adapted: (1) to perform any computation, calculation, program or algorithm described or implied above; (2) to receive signals indicative of human input; (3) to output signals for controlling transducers for outputting information in human perceivable format; (4) to process data, to perform computations, to execute any algorithm or software, and (5) to control the read or write of data to and from memory devices. The one or more computers may be connected to each other or to other components in the system either: (a) wirelessly, (b) by wired or fiber optic connection, or (c) by any combination of wired, fiber optic or wireless connections.

In illustrative implementations of the concepts described herein, one or more computers may be programmed to perform any and all computations, calculations, programs and algorithms described or implied above, and any and all functions described in the immediately preceding paragraph. Likewise, in illustrative implementations of the concepts described herein, one or more non-transitory, machine-accessible media may have instructions encoded thereon for one or more computers to perform any and all computations, calculations, programs and algorithms described or implied above, and any and all functions described in the immediately preceding paragraph.

For example, in some cases: (a) a machine-accessible medium may have instructions encoded thereon that specify steps in a software program; and (b) the computer may access the instructions encoded on the machine-accessible medium, in order to determine steps to execute in the software program. In illustrative implementations, the machine-accessible medium may comprise a tangible non-transitory medium. In some cases, the machine-accessible medium may comprise (a) a memory unit or (b) an auxiliary memory storage device. For example, in some cases, while a program is executing, a control unit in a computer may fetch the next coded instruction from memory.

In some cases, one or more computers are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

As used herein, "including" means including without limitation. As used herein, the terms "a" and "an", when modifying a noun, do not imply that only one of the noun exists. As used herein, unless the context clearly indicates otherwise, "or" means and/or. For example, A or B is true if A is true, or B is true, or both A and B are true. As used herein, "for example", "for instance", "e.g.", and "such as" refer to non-limiting examples that are not exclusive examples. The word "consists" (and variants thereof) are to be give the same meaning as the word "comprises" or "includes" (or variants thereof).

The following definitions and abbreviations are to be used for the interpretation of the specification. As used herein, the terms "comprises," "comprising," "includes," "including," "has," "having," "contains" or "containing," or any other variation thereof, are intended to cover a non-exclusive inclusion.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "at least one" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Use of ordinal terms such as "first," "second," "third," etc., in the specification to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. A device comprising:
a data port, configured to receive data from a client device of an individual using a data communication network;
a decoder, coupled to the data port, configured to decode data received from the client device according to a movie container format, the data including at least (a) a sequence of video frames depicting a physical environment between a start time and an end time, and (b) sensor data collected between the start time and the end time by one or more sensors of the client device;
a video frame store, coupled to the decoder, configured to store the sequence of video frames;
a sensor data store, coupled to the decoder, configured to store the sensor data;
a first delta detection circuit, coupled to the video frame store, configured to identify video frames in the video frame store whose depictions change in accordance with a first change in a physical state of the client device at a first time;
a second delta detection circuit, coupled to the sensor data store, configured to identify values of stored sensor data that represent a second change in the physical state of the client device at a second time; and
a condition evaluation circuit, coupled to the first delta detection circuit and to the second delta detection circuit, configured to determine existence of either a valid condition or an anomalous condition for the data produced by the client device, wherein the valid condition exists when both (a) the first change and the second change are determined to represent the same change in the physical state of the client device, and (b) the first time and the second time are consistent with a timing of that same change, and wherein the anomalous condition exists otherwise;
wherein the data port is further configured to transmit, using the data communication network after receiving a signal from the condition evaluation circuit determining existence of the valid condition, data attesting to the veracity of the sequence of video frames.

2. The device according to claim 1, wherein the data port receives the data using the Internet, and wherein the client device of the individual comprises a smartphone.

3. The device according to claim 1, wherein the data port receives the data as a data stream or as a data file, formatted according to an MP4 standard, and wherein the decoder decodes the data according to the MP4 standard.

4. The device according to claim 1, wherein the sensor data store is configured to store one or more of: global positioning system (GPS) data, or accelerometer data, or gyroscope data, or magnetometer data.

5. The device according to claim 1, wherein the first delta detection circuit, or the second delta detection circuit, or both are configured to identify a change in the client device of one or more of: a physical location, or a velocity, or an acceleration, or an angular orientation.

6. The device according to claim 1, further comprising a machine learning model that categorizes correlated changes between video frames with changes in values of sensor data, wherein the condition evaluation circuit is configured to determine existence of either the valid condition or the anomalous condition by providing the video frames and the sensor data to the machine learning model.

7. The device according to claim 1, wherein the condition evaluation circuit is further configured to determine existence of the valid condition when the sequence of video frames includes steganographic data, or to determine the existence of the anomalous condition when the sequence of video frames lacks the steganographic data.

8. The device according to claim 1, further comprising an attestation circuit configured to generate the data attesting to the veracity of the sequence of video frames.

9. The device according to claim 1, wherein the data port is configured to transmit the data attesting to the veracity of the sequence of video frames to a second client device of a second individual, thereby causing the second client device to communicate the veracity of the sequence of video frames to the second individual before or during display of the sequence.

10. The device according to claim 1, wherein the data port is further configured to transmit, using the data communication network, data relating to the anomalous condition for display on the client device after the condition evaluation circuit determines existence of the anomalous condition.

11. A method comprising:
receiving, from a client device of an individual by a computing device using a data communication network, data produced by the client device according to a container format, the data including at least (a) a sequence of video frames depicting a physical environment between a start time and an end time, and (b) sensor data collected between the start time and the end time by one or more sensors of the client device;
identifying, by the computing device, video frames whose depictions change in accordance with a first change in a physical state of the client device at a first time;
identifying, by the computing device, values of the sensor data that represent a second change in the physical state of the client device at a second time;
determining, by the computing device, existence of either a valid condition or an anomalous condition for the data produced by the client device, wherein the valid condition exists when both (a) the first change and the second change are determined to represent the same change in the physical state of the client device, and (b) the first time and the second time are consistent with a timing of that same change, and wherein the anomalous condition exists otherwise; and transmitting, by the computing device using the data communication network after determining existence of the valid condition, data attesting to the veracity of the sequence of video frames.

12. The method according to claim 11, wherein receiving comprises receiving using the Internet, and wherein the client device of the individual comprises a smartphone.

13. The method according to claim 11, wherein receiving comprises receiving the data produced by the client device as a data stream or as a data file, formatted according to an MP4 standard.

14. The method according to claim 11, wherein receiving comprises receiving the sensor data as one or more of: global positioning system (GPS) data, or accelerometer data, or gyroscope data, or magnetometer data.

15. The method according to claim 11, wherein identifying the first change or the second change in the physical state of the client device includes identifying a change in the client device of one or more of: a physical location, or a velocity, or an acceleration, or an angular orientation.

16. The method according to claim 11, wherein determining existence of either the valid condition or the anomalous condition comprises providing the video frames and the sensor data to a machine learning model that categorizes correlated changes between video frames with changes in values of sensor data.

17. The method according to claim 11, wherein determining existence of the valid condition comprises determining that the sequence of video frames includes steganographic data, or determining the existence of the anomalous condition comprises determining that the sequence of video frames lacks the steganographic data.

18. The method according to claim 11, further comprising generating the data attesting to the veracity of the sequence of video frames.

19. The method according to claim 11, wherein transmitting comprises transmitting the data attesting to the veracity of the sequence of video frames to a second client device of a second individual, thereby causing the second client device to communicate the veracity of the sequence of video frames to the second individual before or during display of the sequence.

20. The method according to claim 11, further comprising transmitting, by the computing device using the data communication network, data relating to the anomalous condition for display on the client device after determining existence of the anomalous condition.

* * * * *